(12) United States Patent  (10) Patent No.: US 7,474,810 B2
Bratkovski et al.  (45) Date of Patent: Jan. 6, 2009

(54) METHOD AND APPARATUS FOR CONTROLLING LIGHT FLUX WITH SUB-MICRON PLASMON WAVEGUIDES

(75) Inventors: Alexandre M. Bratkovski, Mountain View, CA (US); Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 71 days.

(21) Appl. No.: 11/701,014

(22) Filed: May 15, 2007

(65) Prior Publication Data

US 2008/0285917 A1 Nov. 20, 2008

(51) Int. Cl.
*G02F 1/01* (2006.01)
(52) U.S. Cl. .................. 385/1; 385/4; 385/15; 385/27; 385/30; 385/43

(58) Field of Classification Search .................. 385/1, 385/4, 15, 27, 30, 39, 43
See application file for complete search history.

(56) References Cited

U.S. PATENT DOCUMENTS 6,801,686 B2 * 10/2004 Sorin ........................... 385/28
6,859,582 B2 * 2/2005 Cai et al. ...................... 385/30

* cited by examiner

*Primary Examiner*—Jennifer Doan (57) ABSTRACT

Apparatuses and methods for modulating electromagnetic radiation are disclosed. A plasmon waveguide including an array of metallic nanoparticles disposed on a dielectric substrate is provided. The plasmon waveguide is disposed on a MEMS structure. An electromagnetic radiation signal is applied to a tapered fiber disposed proximate the MEMS structure. The intensity of the electromagnetic radiation signal passing through the tapered fiber is modified by displacing a deformable member of the MEMS structure to modify a distance between the plasmon waveguide and the tapered fiber such that an evanescent field of the tapered fiber causes a plasmon resonance in the plasmon waveguide.

20 Claims, 5 Drawing Sheets

METHOD AND APPARATUS FOR CONTROLLING LIGHT FLUX WITH SUB-MICRON PLASMON WAVEGUIDES

FIELD OF THE INVENTION

The present invention relates to photonic waveguides. More particularly, the invention relates to systems for modulating electromagnetic energy in waveguides.

BACKGROUND OF THE INVENTION

A useful function in propagating light signals through optical fibers is the ability to modulate or shutter the intensity of light propagating through a fiber. Conventional optical waveguides are limited by the diffraction limit of light, which is proportional to the wavelength of the light of interest. Therefore, in order to modulate, deflect, or impede propagation of light in fibers, prior proposals use scattering of light on free induced carriers, which is a weak, relatively slow effect and requires shutters with relatively large sizes (e.g., about one centimeter) to shutter off the light.

In contrast to conventional optical waveguides, plasmon waveguides are not limited by the diffraction limit of light. Plasmon waveguides have been the source of significant research in recent years. Optical components such as beam splitters, interferometers, and straight waveguides have been demonstrated using textured metallic films. Furthermore, lateral confinement of the guided mode of waveguides has been proposed using nanowires or metallic stripes at a micron scale instead of the metallic films.

In addition, plasmon waveguides using metallic nanoparticles have been proposed. These nanoparticle plasmon waveguides guide light along an array of the nanoparticles by near field coupling between the nanoparticles. Furthermore, it has been demonstrated that the electromagnetic field generated by this near field coupling may be coupled to other elements near the plasmon waveguide, such as an optical fiber.

There is a need for new methods and apparatuses that modulate light propagation in fibers using sub-micron devices.

BRIEF SUMMARY OF THE INVENTION

Embodiments of the present invention relate to methods and apparatuses to create optical shutter systems that modulate light propagation in fibers using plasmon waveguides and Micro ElectroMechanical System (MEMS) structures for controlling a position of a tapered optical fiber relative to the plasmon waveguide.

An embodiment of the present invention comprises an electromagnetic radiation modulator including a plasmon waveguide, a MEMS structure, and a tapered fiber. The plasmon waveguide includes an array of metallic nanoparticles disposed on a dielectric substrate. The MEMS structure is disposed near the plasmon waveguide and includes a deformable member. The tapered fiber is configured for conveying an electromagnetic radiation signal and includes a tapered portion that is disposed on the deformable member such that an evanescent field from the tapered portion is positioned proximate the plasmon waveguide. Finally, a control signal operably coupled to the MEMS structure is configured to cause the deformable member to displace such that there is a change in a distance between the plasmon waveguide and the tapered portion.

Another embodiment of the present invention comprises an electromagnetic radiation modulator including a tapered fiber, a MEMS structure, and a plasmon waveguide. The tapered fiber includes a tapered portion and is configured for conveying an electromagnetic radiation signal. The MEMS structure is disposed near the tapered portion and includes a deformable member. The plasmon waveguide includes an array of metallic nanoparticles disposed on a dielectric substrate and is disposed on the deformable member of the MEMS structure such that it is proximate an evanescent field from the tapered portion. Finally, a control signal operably coupled to the MEMS structure is configured to cause the deformable member to displace such that there is a change in a distance between the plasmon waveguide and the tapered portion.

Yet another embodiment of the present invention includes a method for modulating electromagnetic radiation. The method includes providing a plasmon waveguide including an array of metallic nanoparticles disposed on a dielectric substrate. The plasmon waveguide is disposed on a MEMS structure. The method also includes applying an electromagnetic radiation signal to a tapered fiber disposed proximate the MEMS structure. Finally, the method includes modifying the intensity of the electromagnetic radiation signal passing through the tapered fiber by displacing a deformable member of the MEMS structure to modify a distance between the plasmon waveguide and the tapered fiber such that an evanescent field of the tapered fiber causes a plasmon resonance in the plasmon waveguide.

The features, advantages, and alternative aspects of the present invention will be apparent to those skilled in the art from a consideration of the following detailed description taken in combination with the accompanying drawings.

BRIEF DESCRIPTION OF THE SEVERAL VIEWS OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Embodiments of the present invention relate to methods and apparatuses to create optical shutter systems that modulate light propagation in fibers using plasmon waveguides and MEMS structures for controlling a position of a tapered optical fiber relative to the plasmon waveguide.

The illustrations presented herein are not meant to be actual views of any particular optical shutter system, but are merely idealized representations which are employed to describe the present invention. Additionally, elements common between figures may retain the same numerical designation.

The description herein first describes elements, and their operation, that may be used in the present invention. Then the description describes how these elements interact in embodiments of the present invention.

Plasmon waveguides may be formed using metallic nanoparticles disposed as an array of nanoparticles on a semiconductor substrate. Plasmon waveguides using one-dimensional arrays of metallic nanoparticles have been proposed by Maier et al. in "Observation of coupled plasmon-polariton modes in Au nanoparticle chain waveguides of different lengths: Estimation of waveguide loss." *Applied Physics Letters*, 81, 9, (2002). Plasmon waveguides using two-dimensional arrays of metallic nanoparticles have been proposed by Maier et al. in "Low-loss fiber accessible plasmon waveguide for planar energy guiding and sensing." *Applied Physics Letters*, 84, 20, (2004). Both of these references discuss and demonstrate the operation of near field coupling to develop a waveguide that can propagate light along the waveguide.

Figure 1A:
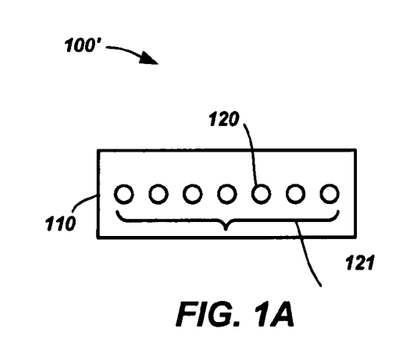
FIG. 1A illustrates a plan view of a one-dimensional plasmon waveguide according to a particular embodiment of the invention.

FIG. 1A illustrates a plan view of a plasmon waveguide 100' as a one-dimensional array 121 of metallic nanoparticles 120 on a dielectric substrate 110. As an example embodiment, and not a limitation, the metallic nanoparticles 120 may be gold or silver, have diameters of about 50 nm, and spacing between nanoparticles of about 30 to 50 nm.

Figure 1B:
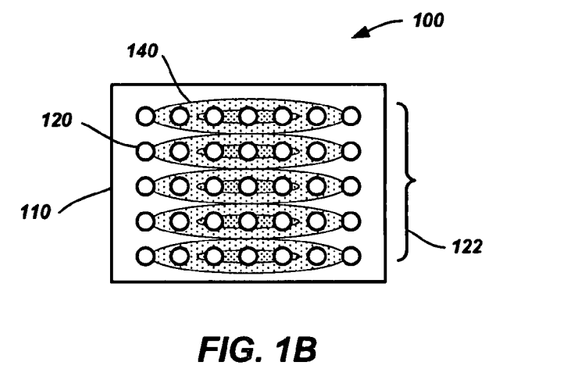
FIG. 1B illustrates a plan view of a two-dimensional plasmon waveguide according to a particular embodiment of the invention.
Figure 1C:
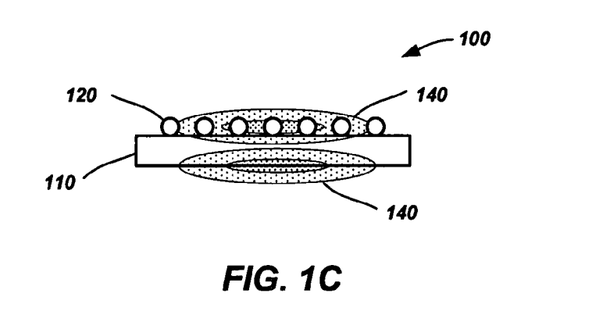
FIG. 1C illustrates a cross section view of the plasmon waveguide of FIG. 1B.

FIG. 1B illustrates a plan view of a plasmon waveguide 100 as a two-dimensional array 122 of metallic nanoparticles 120 on a dielectric substrate 110. FIG. 1C illustrates a cross section view of the plasmon waveguide 100 of FIG. 1B. As an example embodiment, and not a limitation, the metallic nanoparticles 120 may be gold or silver and have diameters of about 50 nm. A linear lateral grating assists in confining the waveguide to a center line of the array. As examples, the lateral spacing in the center of the waveguide may be about 80 nm and progressing to a lateral spacing of about 50 nm near the outer edges of the waveguide.

The substrate may be formed as a hybrid structure of Silicon-On-Insulator (SOI) on an optically thin silicon membrane. By way of example, and not limitation, the substrate may have a thickness of about 250 nm.

Surface plasmons are electromagnetic excitations at a metal/dielectric interface. The surface plasmons represent optical waves coupled to free electron oscillations in metal. Surface plasmons can propagate along the interface between the media. As a result, the surface plasmon wavelength depends on the properties of both the metal and the dielectric through a dispersion relationship between the dielectric permittivities of the metal and dielectric. In metals the permittivity may be negative and wavelength dependent. Whereas, permittivity of dielectrics is normally positive. With this combination of negative and positive permittivities, at the proper frequency a surface plasmon resonance can be attained. Furthermore, the plasmon resonance can be excited by light or an electromagnetic field impinging on the plasmon waveguide.

Energy transport between interacting nanoparticles relies on the excitation of modes that have a finite wave vector. The group velocity and propagation loss depend on the number of directly interacting nanoparticles. It has been shown that one-dimensional arrays with as few as 3 nanoparticles can generate plasmon resonant energies. Furthermore, it has been shown that the plasmon resonant energy approaches a saturation level with one-dimensional particle chain lengths of seven or more.

Also illustrated in FIGS. 1B and 1C are representations of electric field distributions 140 in and around the waveguide at plasmon resonance. When in resonance, the metallic nanoparticles maintain an increased electromagnetic near field. This near field evanescently decays at increasing distances away from the surface of the metallic nanoparticles. For example, the evanescent field may exist within a few tens of nanometers away from the metallic nanoparticles. Those of ordinary skill in the art will recognize that the evanescent field decay is a continuous function rather than the discrete representation in FIGS. 1B and 1C. Furthermore, while not shown, the plasmon waveguide 100' of FIG. 1A would have similar electric field distributions.

Figure 2:
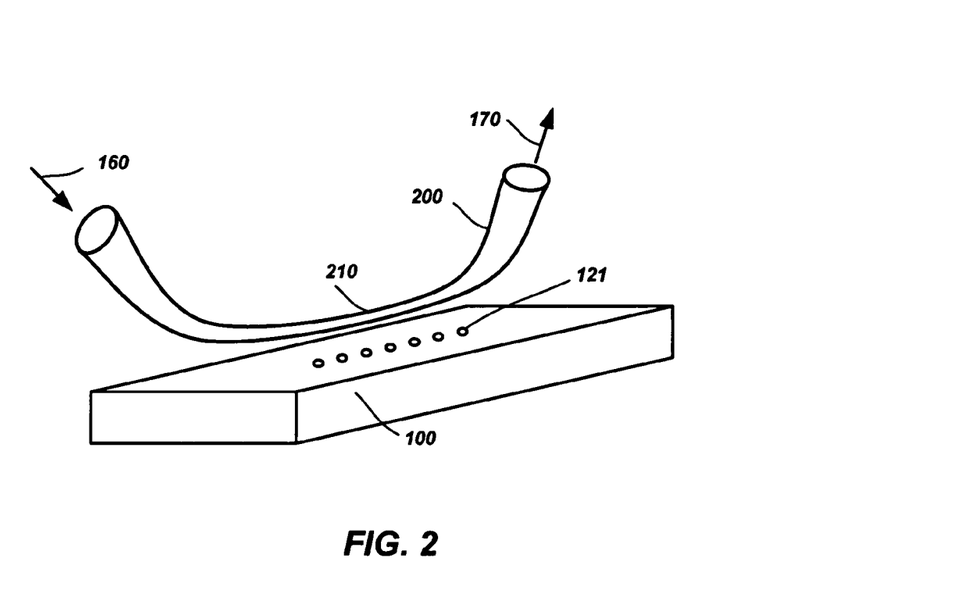
FIG. 2 illustrates a tapered fiber disposed proximate a plasmon waveguide according to a particular embodiment of the invention.

FIG. 2 illustrates a tapered fiber 200 disposed proximate a plasmon waveguide 100. The tapered fiber 200 includes a tapered portion 210 that is disposed proximate the metallic nanoparticles of the plasmon waveguide 100. While FIG. 2 illustrates a one-dimensional array 121 of nanoparticles, those of ordinary skill in the art will recognize that a two-dimensional array also may be used. Also illustrated in FIG. 2 is an electromagnetic radiation signal 160 as an input to one end of the tapered fiber 200, and a modulated electromagnetic radiation signal 170 as an output from the other end of the tapered fiber 200. By way of example, and not limitation, the electromagnetic radiation signals may be of a wavelength such as visible light and near-infrared light.

Figure 3A:
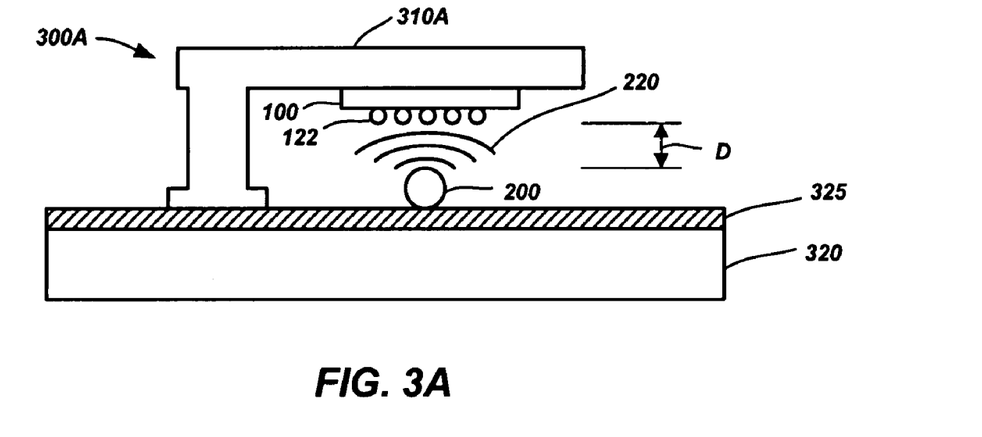
FIG. 3A illustrates a MEMS structure with a plasmon waveguide disposed thereon and tapered fiber disposed proximate the plasmon waveguide according to a particular embodiment of the invention.
Figure 3B:
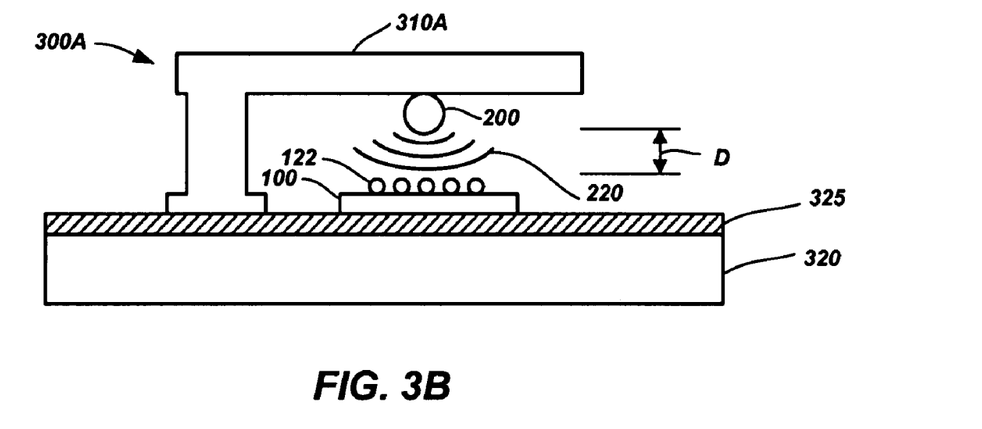
FIG. 3B illustrates a MEMS structure with a tapered fiber disposed thereon and a plasmon waveguide disposed proximate the tapered fiber according to a particular embodiment of the invention.

FIG. 3A illustrates a MEMS structure 300A with a plasmon waveguide 100 and a tapered fiber 200. FIG. 3B illustrates an alternative MEMS structure 300A with a plasmon waveguide 100 and a tapered fiber 200. Throughout FIGS. 3A-6B the plasmon waveguide 100 is illustrated with a two-dimensional array 122 of metallic nanoparticles. Those of ordinary skill in the art will recognize that each of the embodiments of FIGS. 3A-6B may include a one-dimensional array (as illustrated in FIG. 2) rather than a two-dimensional array 122.

The MEMS structure 300A of FIGS. 3A and 3B includes a MEMS substrate 320, an electrically insulating layer 325, and an electrically conductive, laterally extending, elongated cantilever member 310A.

In FIG. 3A, the plasmon waveguide 100 is disposed on the unsupported end of the cantilever member 310A and the tapered fiber 200 is disposed proximate the plasmon waveguide 100 and separated therefrom by a distance D. On the other hand, in FIG. 3B, the tapered fiber 200 is disposed on the unsupported end of the cantilever member 310A and the plasmon waveguide 100 is disposed proximate the tapered fiber 200 and separated therefrom by the distance D.

The MEMS substrate 320 may be formed from, for example, a crystalline or polycrystalline silicon wafer. The cantilever member 310A may include, for example, a semiconductor material, such as doped silicon or doped germanium. The cantilever member 310A is electrically isolated from the MEMS substrate 320 by the insulating layer 325. Electrodes (not shown) may be provided on the MEMS substrate 320 and the cantilever member 310A such that an electrical control signal may be applied between the cantilever member 310A and the MEMS substrate 320. The MEMS can also be nanostructure electromechanical systems (NEMS) where carbon nanotube, Si nanowires, etc., can be used as a cantilever structure.

If the cantilever member 310A and the MEMS substrate 320 are electrically charged (using the control signal) with opposite charge (i.e., either the cantilever member 310A or the MEMS substrate 320 is negatively charged and the other positively charged), electrostatic forces can be generated that cause the cantilever member 310A to deflect downward towards the MEMS substrate 320 and the distance between the plasmon waveguide 100 and the tapered fiber 200 to decrease.

Conversely, if the cantilever member 310A and the MEMS substrate 320 are electrically charged with like charge (i.e., the cantilever member 310A and the MEMS substrate 320 are both charged with either positive charge or negative charge), electrostatic forces can be generated that cause the cantilever member 310A to deflect upward away from the MEMS substrate 320 and the distance between the plasmon waveguide 100 and the tapered fiber 200 to increase.

In the embodiments of FIGS. 3A and 3B, when an electromagnetic radiation signal, such as, for example, visible light or near-infrared light is propagating through the tapered fiber 200, an evanescent field 220 is present around the tapered fiber 200. As was stated earlier, the evanescent field 220 will decay with increasing distances away from the tapered fiber 200.

The tapered fiber 200 is positioned in close proximity to the waveguide so that the evanescent field 220 from the fiber can strongly couple to the plasmon waveguide's 100 plasmon mode. The configuration of the plasmon waveguide 100 keeps the plasmon well confined. When the matching conditions are satisfied with a strong coupling, about 75% of the radiation from the tapered fiber 200 may be coupled into the plasmon waveguide 100 and excite the plasmonic mode (also referred to as plasmon resonance) in the plasmon waveguide 100. This coupling will attenuate the signal in the fiber about 0.1 dB/nm. By way of example, and not limitation, with an average diameter of 50 nm separated by 30-50 nm of spacing, the coupled power will be substantially dissipated by a row of 5-10 nanoparticles.

As a result of the attenuation, embodiments of the present invention operate as a shutter for the electromagnetic radiation propagating through the tapered fiber 200. Furthermore, by modifying the distance D the coupling may be easily tuned to a specific wavelength. In addition, the shutting effect may be facilitated by rapid change in the amount of power coupled to the waveguide by changing the position of the tapered fiber relative to the plasmon waveguide. The position of the fiber with respect to the plasmon waveguide may be changed continuously within a certain range and produce very efficient coupling (up to about 75% power being transferred to the plasmon waveguide) that then will result in dissipation loss in the plasmon waveguide.

Thus, in the embodiments of FIGS. 3A and 3B, as stated earlier the cantilever member 310A may be moved up or down to modify the distance D between the plasmon waveguide 100 and the tapered fiber 200. This modification of the distance D will modify the strength of the evanescent field 220 at the plasmon waveguide 100 and, as a result, the amount of coupling to the plasmon waveguide. With less coupling, the attenuation achieved in the tapered fiber 200 will be decreased and with more coupling the attenuation achieved in the tapered fiber 200 will be increased.

Figure 4A:
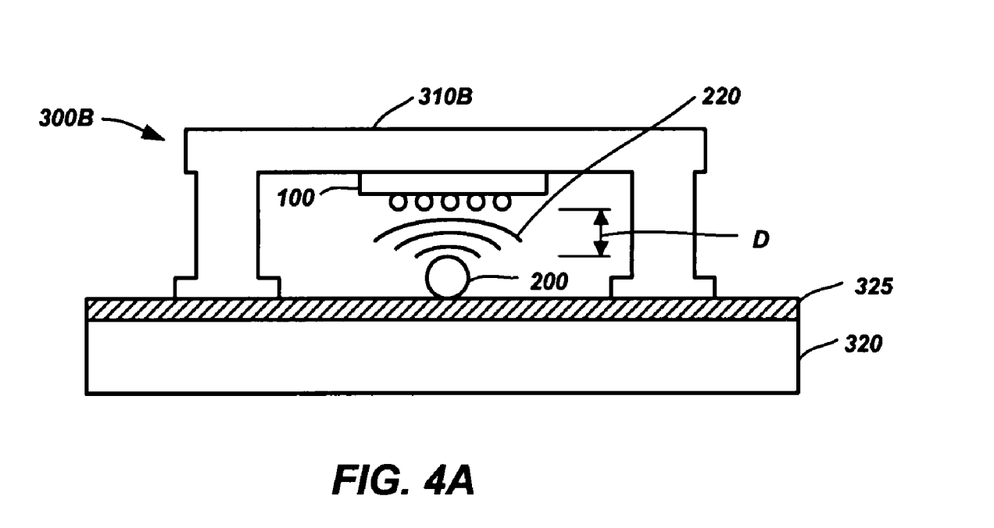
FIG. 4A illustrates another MEMS structure with a plasmon waveguide disposed thereon and a tapered fiber disposed proximate the plasmon waveguide according to a particular embodiment of the invention.
Figure 4B:
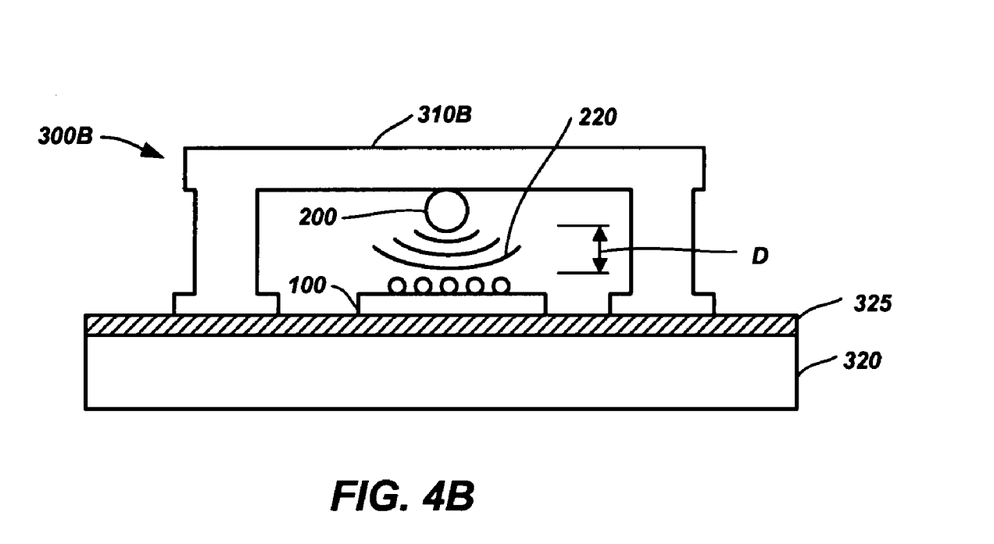
FIG. 4B illustrates another MEMS structure with a tapered fiber disposed thereon and a plasmon waveguide disposed proximate the tapered fiber according to a particular embodiment of the invention.

FIG. 4A illustrates a MEMS structure 300B with a plasmon waveguide 100 and a tapered fiber 200. FIG. 4B illustrates an alternative MEMS structure 300B with a plasmon waveguide 100 and a tapered fiber 200.

The MEMS structure 300B of FIGS. 4A and 4B includes a MEMS substrate 320, an electrically insulating layer 325, and an electrically conductive, deflectable bridge-type beam member 310B.

In FIG. 4A, the plasmon waveguide 100 is disposed on the bridge-type beam member 310B and the tapered fiber 200 is disposed proximate the plasmon waveguide 100 and separated therefrom by the distance D. In contrast, in FIG. 3B, the tapered fiber 200 is disposed on the bridge-type beam member 310B and the plasmon waveguide 100 is disposed proximate the tapered fiber 200 and separated therefrom by the distance D.

The MEMS substrate 320 may be formed from, for example, a crystalline or polycrystalline silicon wafer. The bridge-type beam member 310B may include, for example, a semiconductor material, such as doped silicon or doped germanium. The bridge-type beam member 310B is electrically isolated from the MEMS substrate 320 by the insulating layer 325. Electrodes (not shown) may be provided on the MEMS substrate 320 and the bridge-type beam member 310B such that an electrical control signal may be applied between the bridge-type beam member 310B and the MEMS substrate 320.

In a fashion similar to the embodiments of FIGS. 3A and 3B, in the embodiments of FIGS. 4A and 4B, the distance D between the plasmon waveguide 100 and the MEMS substrate 320 may be modified by causing the middle of the bridge-type beam member 310B to deflect up or down depending on the relative charges placed on the bridge-type beam member 310B and the MEMS substrate 320 by a control signal (not shown). Modification of the distance D, will modify the strength of the evanescent field 220 at the plasmon waveguide 100 and, as a result, the amount of coupling to the plasmon waveguide and amount of signal attenuation in the tapered fiber 200.

Figure 5A:
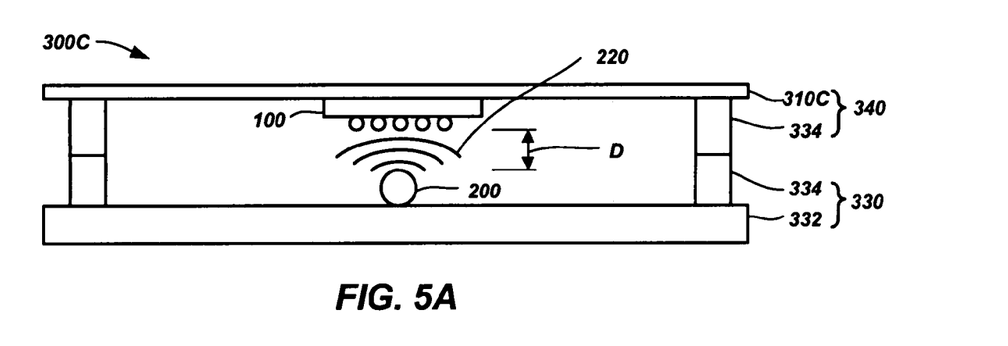
FIG. 5A illustrates another MEMS structure with a plasmon waveguide disposed thereon and a tapered fiber disposed proximate the plasmon waveguide according to a particular embodiment of the invention.
Figure 5B:
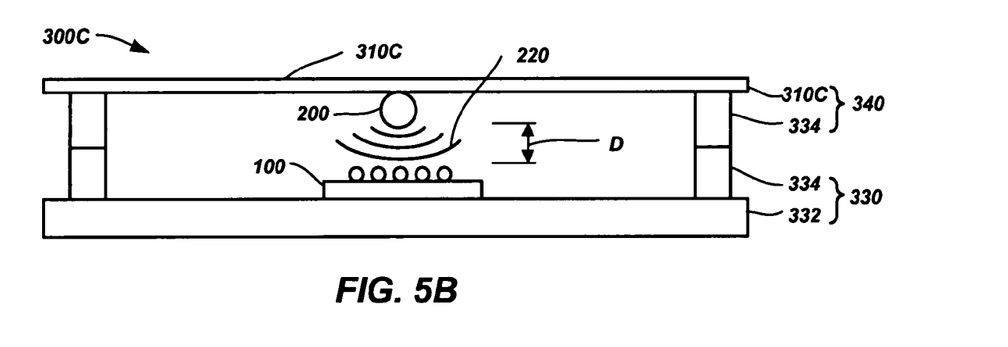
FIG. 5B illustrates another MEMS structure with a tapered fiber disposed thereon and a plasmon waveguide disposed proximate the tapered fiber according to a particular embodiment of the invention.

FIG. 5A illustrates a MEMS structure 300C with a plasmon waveguide 100 and a tapered fiber 200. FIG. 5B also illustrates an alternative MEMS structure 300C with a plasmon waveguide 100 and a tapered fiber 200.

The MEMS structure 300C of FIGS. 5A and 5B includes a first plate-shaped member 330 and a second plate-shaped member 340. The first plate-shaped member 330 includes a first substrate 332 and three or more electrically insulating spacers 334. The second plate-shaped member 340 is substantially similar to the first plate-shaped member 330 and includes a second substrate 310C and electrically insulating spacers 334 matching the locations of the insulating spacers 334 on the first substrate 332.

The first substrate 332 and the second substrate 310C may be formed from any material capable of conducting electrical charge, such as, for example, a doped crystalline or polycrystalline silicon wafer. The second substrate 310C may be optionally thinner than the first substrate 332 to more easily allow the center of the first substrate 332 to be deflected relative to the first substrate 332. The insulating spacers 334 may be formed from, for example, silicon oxide.

The MEMS structure 300C may be formed by stacking the second plate-shaped member 340 on top of the first plate-shaped member 330 such that the insulating spacers 334 from the first plate-shaped member 330 abut against the insulating spacers 334 from the second plate-shaped member 340.

In FIG. 5A, the plasmon waveguide 100 is disposed substantially near the center of the second plate-shaped member 340 and the tapered fiber 200 is disposed proximate the plasmon waveguide 100 and separated therefrom by the distance D. On the other hand, in FIG. 5B, the tapered fiber 200 is disposed substantially near the center of the second plate-shaped member 340 and the plasmon waveguide 100 is disposed proximate the tapered fiber 200 and separated therefrom by the distance D.

The second substrate 310C is electrically isolated from the first substrate 332 by the insulating spacers 334. Alternatively, only one set of insulating spacers may be provided (i.e., either the first plate-shaped member's 330 or the second plate-shaped member's 340) so long as sufficient spacing is provided between the plasmon waveguide 100 and the tapered fiber 200. Electrodes (not shown) may be formed on the first substrate 332 and the second substrate 310C for electrically charging the first substrate 332 and the second substrate 310C.

In a fashion similar to the embodiments of FIGS. 3A and 3B, in the embodiments of FIGS. 5A and 5B, the distance D between the plasmon waveguide 100 and the MEMS substrate 320 may be modified by causing the center portion of the second substrate 310C to deflect up or down depending on the relative charges placed on the second substrate 310C and the first substrate 332 by a control signal (not shown). Modification of the distance D, will modify the strength of the evanescent field 220 at the plasmon waveguide 100 and, as a result, the amount of coupling to the plasmon waveguide and amount of signal attenuation in the tapered fiber 200.

Figure 6A:
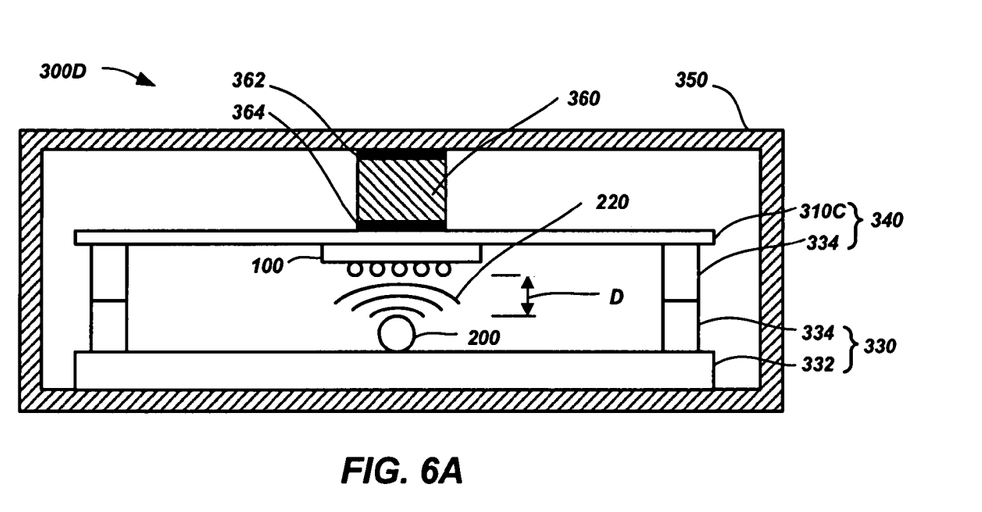
FIG. 6A illustrates another MEMS structure with a plasmon waveguide disposed thereon and a tapered fiber disposed proximate the plasmon waveguide according to a particular embodiment of the invention.
Figure 6B:
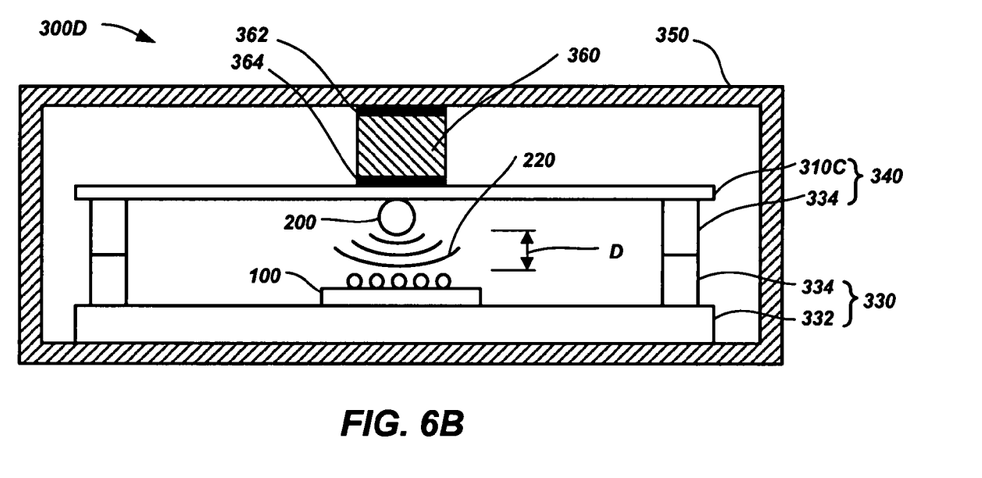
FIG. 6B illustrates another embodiment of a MEMS structure with a tapered fiber disposed thereon and a plasmon waveguide disposed proximate the tapered fiber.

FIG. 6A illustrates a MEMS structure 300D similar to that of FIG. 5A with a plasmon waveguide 100 and a tapered fiber 200. FIG. 6B illustrates an alternative MEMS structure 300D with a plasmon waveguide 100 and a tapered fiber 200.

The MEMS structure 300D of FIGS. 6A and 6B includes a first plate-shaped member 330 and a second plate-shaped member 340. The first plate-shaped member 330 includes a first substrate 332 and four or more electrically insulating spacers 334. The second plate-shaped member 340 is substantially similar to the first plate-shaped member 330 and includes a second substrate 310C and electrically insulating spacers 334 matching the locations of the insulating spacers on the first substrate 332.

The MEMS structure 300C may be formed by stacking the second plate-shaped member 340 on top of the first plate-shaped member 330 such that the insulating spacers 334 from the first plate-shaped member 330 abut against the insulating spacers 334 from the second plate-shaped member 340.

Mechanical forces are used to deflect the center of the second substrate 310C relative to the first substrate 332, in contrast to the use of electrostatic forces, as previously discussed in relation to the embodiments of FIGS. 5A and 5B.

The MEMS structure 300 also includes a retaining structure 350 and a piezoelectric device 360 configured such that the mechanical forces used to deflect the center of the second substrate 310C can be generated by the piezoelectric device 360. The piezoelectric device 360 may be disposed between a surface of the second substrate 310C and the retaining structure 350. The piezoelectric device 360 can be formed from any piezoelectric material such as, for example, lead zirconate titanate (PZT), barium titanate, or quartz. A first electrode 362 and a second electrode 364 can be provided on opposite ends of the piezoelectric device 360 for applying a voltage across the piezoelectric material.

In the absence of a voltage between the first electrode 362 and the second electrode 364, the second substrate 310C assumes a generally flat planar configuration. Applying a voltage across the piezoelectric material causes the physical dimensions of the piezoelectric device 360 to change. As the physical dimensions of the piezoelectric device 360 change, they will exert a force against both the retaining structure 350 and the second substrate 310C, which causes the center of the second substrate 310C to deflect relative to the first substrate 332 changing the distance D.

Applying a voltage of a first polarity across the piezoelectric material can cause the piezoelectric device 360 to expand in the direction perpendicular to the plane of the second substrate 310C. This causes the center of the second substrate 310C to deflect downward towards the first substrate 332 and decreases the distance D.

If the polarity of the voltage applied across the piezoelectric material is reversed the piezoelectric device 360 will contract in the direction perpendicular to the plane of the substrate 42C, causing the center of the second substrate 310C to deflect upwards away from the first substrate 332 and increase the distance D.

As with the other embodiments, modification of the distance D, will modify the strength of the evanescent field 220 at the plasmon waveguide 100 and, as a result, the amount of coupling to the plasmon waveguide and amount of signal attenuation in the tapered fiber 200.

Alternatively, other means for applying a mechanical force to the second substrate 310C to deflect the center portion of the second substrate 310C relative to the first substrate 332 could be employed. These other means might include, for example, pneumatic, hydraulic, or other electromechanical means. Depending on size of the MEMS/NEMS, mechanical deflection frequencies can be anywhere from DC from ~GHz to 10s of GHz. Combination of NEMS, including capacitively coupled NEMS arrays, can also be used in series to increase the attenuation or selectivity of different frequencies.

While the embodiments illustrated in the drawings generally illustrate the tapered fiber 200 deflecting in a direction perpendicular to the plasmon waveguide 100, those of ordinary skill in the art will recognize that the plasmon waveguide 100, tapered fiber 200, and MEMS structure. 300 may be configured such that the deflection is in a direction substantially parallel, or diagonally, relative to the plane of the plasmon waveguide 100.

Although the foregoing description contains many specifics, these are not to be construed as limiting the scope of the present invention, but merely as providing certain exemplary embodiments. Similarly, other embodiments of the invention can be devised which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. An electromagnetic radiation modulator, comprising:
   a plasmon waveguide including an array of metallic nanoparticles disposed on a dielectric substrate; and
   a MEMS structure disposed near the plasmon waveguide and including a deformable member;
   a tapered fiber configured for conveying an electromagnetic radiation signal and including a tapered portion disposed on the deformable member such that an evanescent field from the tapered portion is positioned proximate the plasmon waveguide; and
   a control signal operably coupled to the MEMS structure and configured to cause the deformable member to displace such that there is a change in a distance between the plasmon waveguide and the tapered portion.

2. The electromagnetic radiation modulator of claim 1, wherein the array of metallic nanoparticles is disposed in an arrangement selected from the group consisting of a one-dimensional array and a two-dimensional array.

3. The electromagnetic radiation modulator of claim 1, wherein the metallic nanoparticles are formed of a material selected from the group consisting of a gold and silver.

4. The electromagnetic radiation modulator of claim 1, wherein the change in the distance is toward a higher intensity region of the evanescent field or toward a lower intensity region of the evanescent field.

5. The electromagnetic radiation modulator of claim 1, wherein the deformable member comprises a cantilever member and the tapered portion is disposed near an end of the cantilever member and suspended in a movable position relative to the plasmon waveguide such that a deflection of the cantilever member causes the change in the distance from the plasmon waveguide.

6. The electromagnetic radiation modulator of claim 1, wherein the deformable member comprises a deflectable bridge-type beam member and the tapered portion is disposed on the bridge-type beam member and suspended in a movable position relative to the plasmon waveguide such that a deflection of the bridge-type beam member causes the change in the distance from the plasmon waveguide.

7. The electromagnetic radiation modulator of claim 1, wherein:
   the MEMS structure further comprises a first plate-shaped member;
   the deformable member further comprises a thin deflectable second plate-shaped member disposed proximate the first plate-shaped member, the tapered portion being disposed on the second plate-shaped member and suspended in a movable position relative to the plasmon waveguide; and
   at least one support spacer disposed between the first plate-shaped member and the second plate-shaped member;
   wherein a deflection of the second plate-shaped member causes the change in the distance from the plasmon waveguide.

8. The electromagnetic radiation modulator of claim 7, wherein the deflection of the second plate-shaped member is caused by either the control signal applied between the first plate-shaped member and the second plate-shaped member or by a mechanical force applied to the second plate-shaped member.

9. An electromagnetic radiation modulator, comprising:
   a tapered fiber including a tapered portion and configured for conveying an electromagnetic radiation signal;
   a MEMS structure disposed near the tapered portion and including a deformable member;
   a plasmon waveguide comprising an array of metallic nanoparticles disposed on a dielectric substrate, the plasmon waveguide disposed on the deformable member of the MEMS structure such that it is proximate an evanescent field from the tapered portion; and
   a control signal operably coupled to the MEMS structure and configured to cause the deformable member to displace such that there is a change in a distance between the plasmon waveguide and the tapered portion.

10. The electromagnetic radiation modulator of claim 9, wherein the array of metallic nanoparticles is disposed in an arrangement selected from the group consisting of a one-dimensional array and a two-dimensional array.

11. The electromagnetic radiation modulator of claim 9, wherein the metallic nanoparticles are formed of a material selected from the group consisting of a gold and silver.

12. The electromagnetic radiation modulator of claim 9, wherein the change in the distance is toward a higher intensity region of the evanescent field or toward a lower intensity region of the evanescent field.

13. The electromagnetic radiation modulator of claim 9, wherein the deformable member comprises a cantilever member and the plasmon waveguide is disposed near an end of the cantilever member and suspended in a movable position relative to the tapered portion such that a deflection of the cantilever member causes the change in the distance from the tapered portion.

14. The electromagnetic radiation modulator of claim 9, wherein the deformable member comprises a deflectable bridge-type beam member and the plasmon waveguide is disposed on the bridge-type beam member and suspended in a movable position relative to the tapered portion such that a deflection of the bridge-type beam member causes the change in the distance from the tapered portion.

15. The electromagnetic radiation modulator of claim 9, wherein:
   the MEMS structure further comprises a first plate-shaped member;
   the deformable member further comprises a thin deflectable second plate-shaped member disposed proximate the first plate-shaped member, the plasmon waveguide being disposed on the second plate-shaped member and suspended in a movable position relative to the tapered portion; and
   at least one support spacer disposed between the first plate-shaped member and the second plate-shaped member;
   wherein a deflection of the second plate-shaped member causes the change in the distance from the tapered portion.

16. The electromagnetic radiation modulator of claim 15, wherein the deflection of the second plate-shaped member is caused by either the control signal applied between the first plate-shaped member and the second plate-shaped member or by a mechanical force applied to the second plate-shaped member.

17. A method for modulating electromagnetic radiation, comprising:
   providing a plasmon waveguide comprising an array of metallic nanoparticles disposed on a dielectric substrate, wherein the plasmon waveguide is disposed on a MEMS structure;
   applying an electromagnetic radiation signal to a tapered fiber disposed proximate the MEMS structure; and
   modifying the intensity of the electromagnetic radiation signal passing through the tapered fiber by displacing a deformable member of the MEMS structure to modify a distance between the plasmon waveguide and the tapered fiber such that an evanescent field of the tapered fiber causes a plasmon resonance in the plasmon waveguide.

18. The method of claim 17, wherein providing the plasmon waveguide further comprises disposing the array of metallic nanoparticles in an arrangement selected from the group consisting of a one-dimensional array and a two-dimensional array.

19. The method of claim 17, wherein modifying the intensity is due to a modification of the distance toward a higher intensity region of the evanescent field or toward a lower intensity region of the evanescent field.

20. The method of claim 17, wherein providing the plasmon waveguide further comprises disposing metallic nanoparticles formed of a material selected from the group consisting of a gold and silver.

* * * * *